(12) United States Patent
Geriavenko et al.

(10) Patent No.: US 11,913,224 B2
(45) Date of Patent: *Feb. 27, 2024

(54) LOUVERED PERGOLA

(71) Applicant: 10087122 Canada Ltd., Mississauga (CA)

(72) Inventors: Rostyslav Geriavenko, Kleinburg (CA); Marek Piotr Ciolek, Mississauga (CA)

(73) Assignee: 10087122 CANADA LTD., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,573

(22) Filed: Sep. 27, 2022

(65) Prior Publication Data

US 2023/0015282 A1 Jan. 19, 2023

Related U.S. Application Data

(63) Continuation of application No. 17/301,993, filed on Apr. 21, 2021, now Pat. No. 11,486,139.

(60) Provisional application No. 63/014,286, filed on Apr. 23, 2020.

(51) Int. Cl.
*E04B 7/16* (2006.01)
*E04F 10/10* (2006.01)

(52) U.S. Cl.
CPC .............. *E04B 7/163* (2013.01); *E04F 10/10* (2013.01)

(58) Field of Classification Search
CPC .................................. E04F 10/10; E04B 7/163
See application file for complete search history.

(56) References Cited

U.S. PATENT DOCUMENTS

| | | | |
|---|---|---|---|
| 3,263,389 A | | 8/1966 | Heirich |
| 4,926,599 A | * | 5/1990 | Scholz ................ E04F 10/10 |
| | | | 49/90.1 |
| 10,094,122 B1 | * | 10/2018 | Akbulut ................ E04B 7/163 |

(Continued)

FOREIGN PATENT DOCUMENTS

| | | | | |
|---|---|---|---|---|
| CN | 202559576 U | * | 11/2012 | .............. E04F 10/08 |
| CN | 107548425 A | | 1/2018 | |

(Continued)

OTHER PUBLICATIONS

KE USA Inc., Extrusion. Accessed: https://www.keoutdoordesign.com/en-us/. Accessed: Prior to Apr. 23, 2020. 1 page.

*Primary Examiner* — Beth A Stephan

(57) ABSTRACT

A louvered pergola includes (a) a plurality of horizontally spaced apart posts; (b) an elevated frame supported by the posts and defining a central frame opening; and (c) a plurality of louvers supported by the frame and extended parallel with each other across the frame opening. The plurality of louvers include a static first louver fixed to the frame, a static second louver fixed to the frame opposite the static first louver, and a plurality of pivotable louvers pivotably supported by the frame between the static first and second louvers. The pivotable louvers are pivotable relative to the static first and second louvers between a closed position in which each pair of adjacent louvers of the plurality of louvers interlock to close the frame opening, and an open position in which a gap is provided between each pair of adjacent louvers of the plurality of louvers.

17 Claims, 10 Drawing Sheets

(56) References Cited

U.S. PATENT DOCUMENTS

| | | | | |
|---|---|---|---|---|
| 10,851,544 B1* | 12/2020 | Volin | .................. | E04F 10/08 |
| 10,988,926 B2* | 4/2021 | Mitchell | ................. | E04B 7/163 |
| 11,486,139 B2* | 11/2022 | Geriavenko | ............ | E04F 10/10 |
| 2014/0130988 A1* | 5/2014 | Frigerio | ................. | E04B 7/166 |
| | | | | 160/161 |
| 2014/0175240 A1* | 6/2014 | Selzer | .................... | E04B 7/163 |
| | | | | 49/82.1 |
| 2018/0127982 A1* | 5/2018 | Lemiegre | ............... | E04F 10/00 |
| 2018/0320374 A1* | 11/2018 | Castel | ....................... | E03B 3/03 |
| 2019/0338528 A1* | 11/2019 | Torman | .................. | E04F 10/10 |
| 2020/0354962 A1* | 11/2020 | Whytlaw | ............... | E06B 7/096 |
| 2021/0363752 A1* | 11/2021 | Wagaman | ............... | E04F 10/10 |

FOREIGN PATENT DOCUMENTS

| | | | | |
|---|---|---|---|---|
| CN | 111608338 A | 9/2020 | | |
| CN | 111946104 A | 11/2020 | | |
| DE | 102018005087 A1 | 2/2020 | | |
| EP | 3301240 A1 | 4/2018 | | |
| EP | 3363963 A1 | 9/2019 | | |
| EP | 3591136 A1 | 1/2020 | | |
| WO | 2015011263 A1 | 1/2015 | | |
| WO | 2018054703 A1 | 3/2018 | | |
| WO | WO-2019084590 A1 * | 5/2019 | ............. | E04F 10/10 |
| WO | 2020007908 A1 | 1/2020 | | |
| WO | 2020074451 A1 | 4/2020 | | |

\* cited by examiner

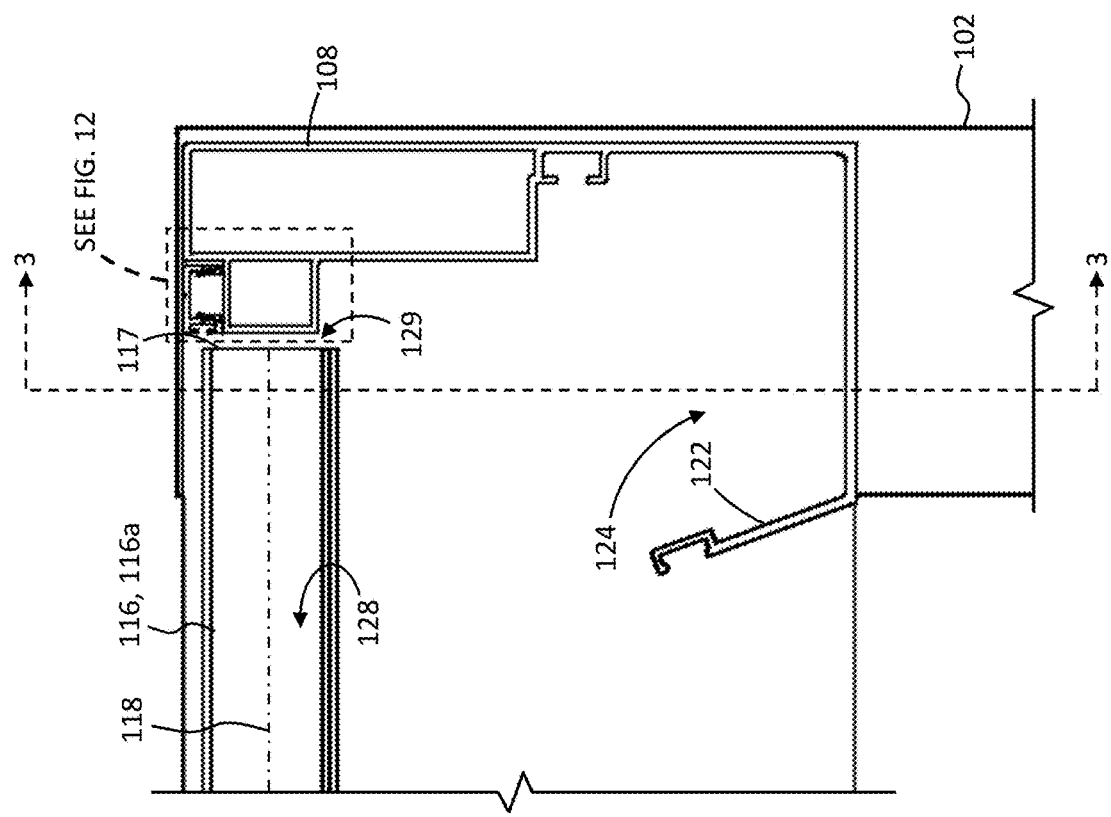
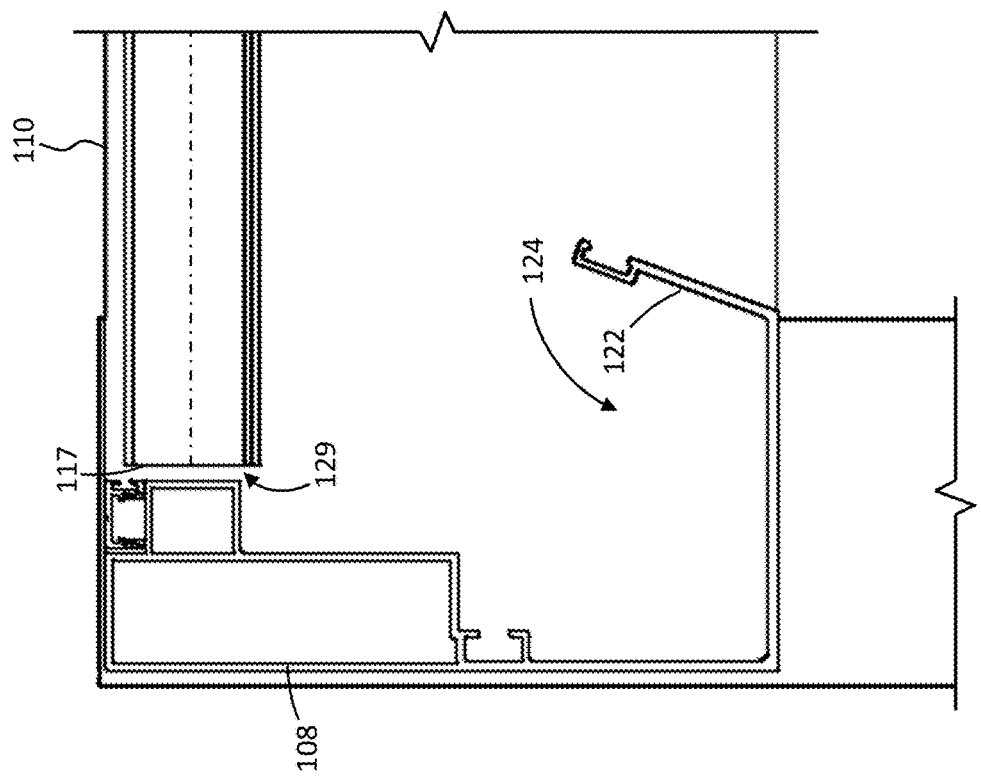
FIG. 5

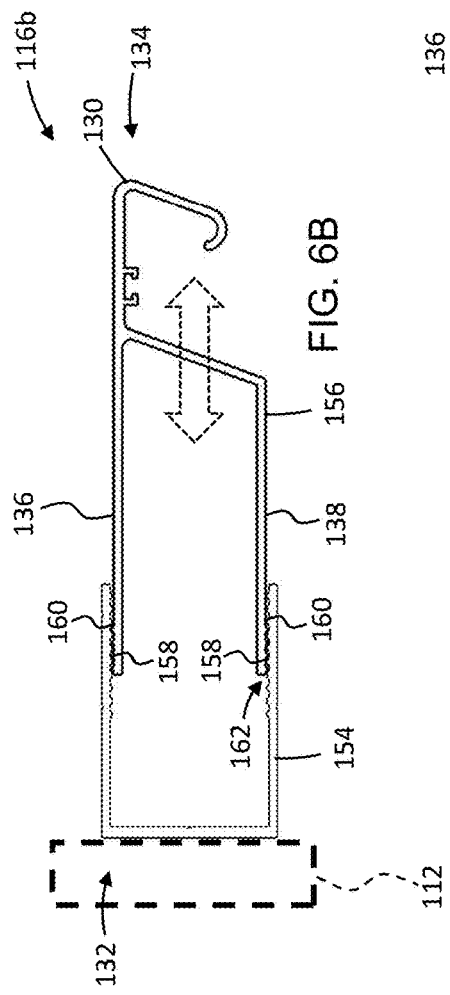
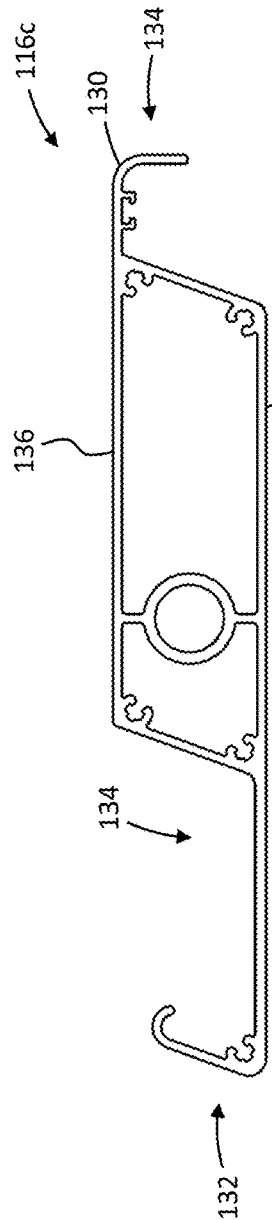
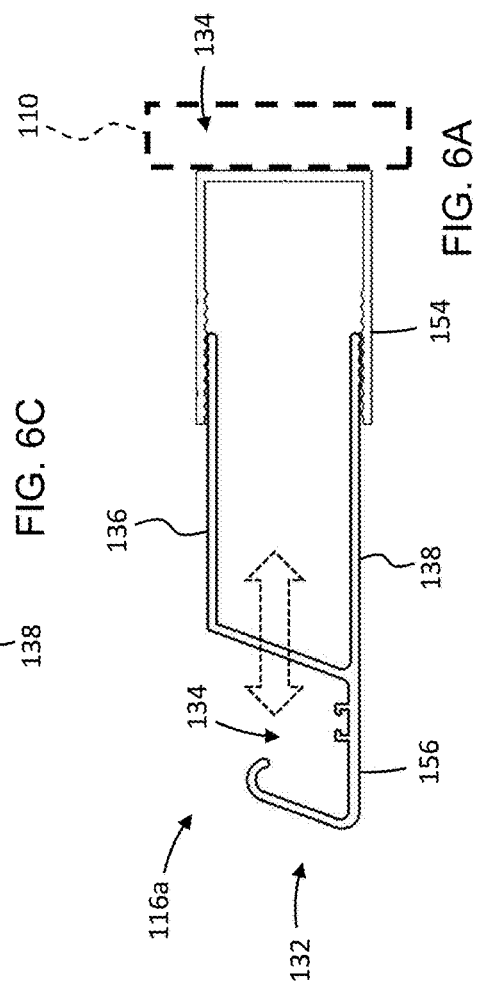

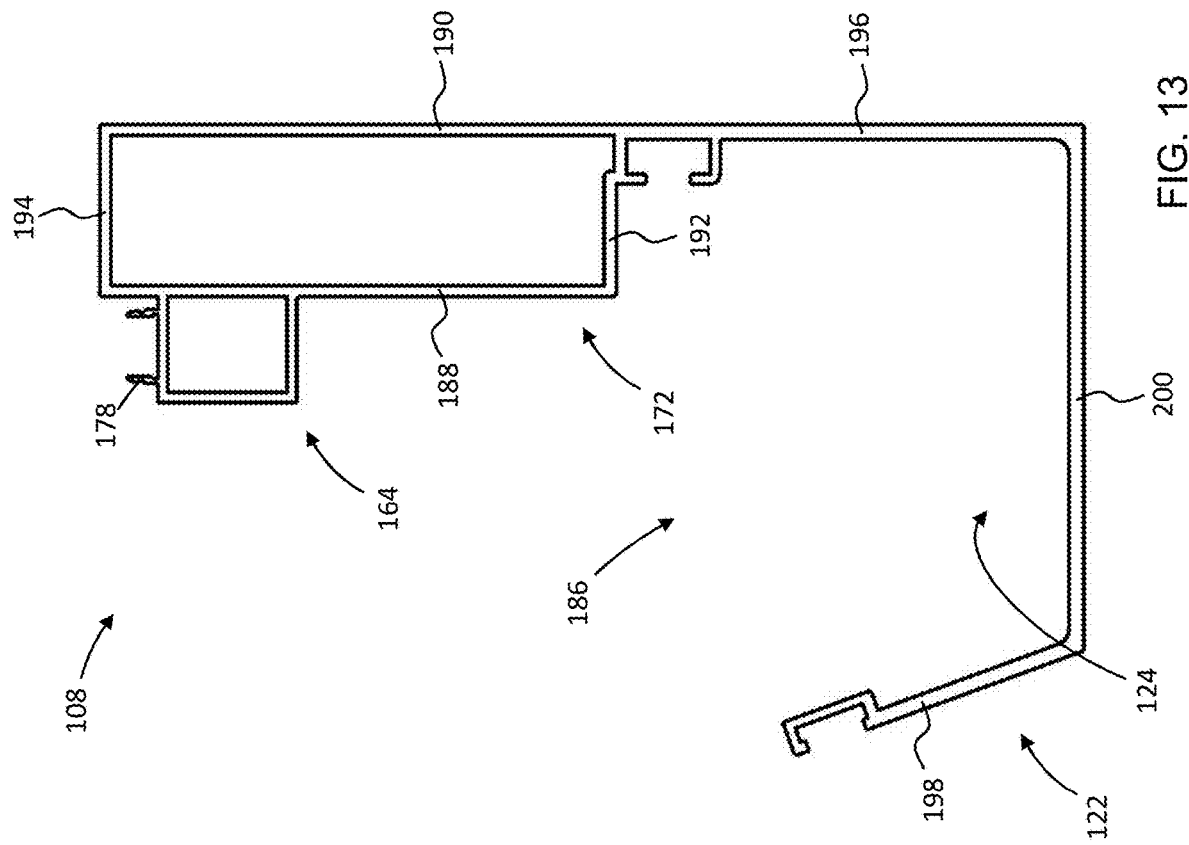
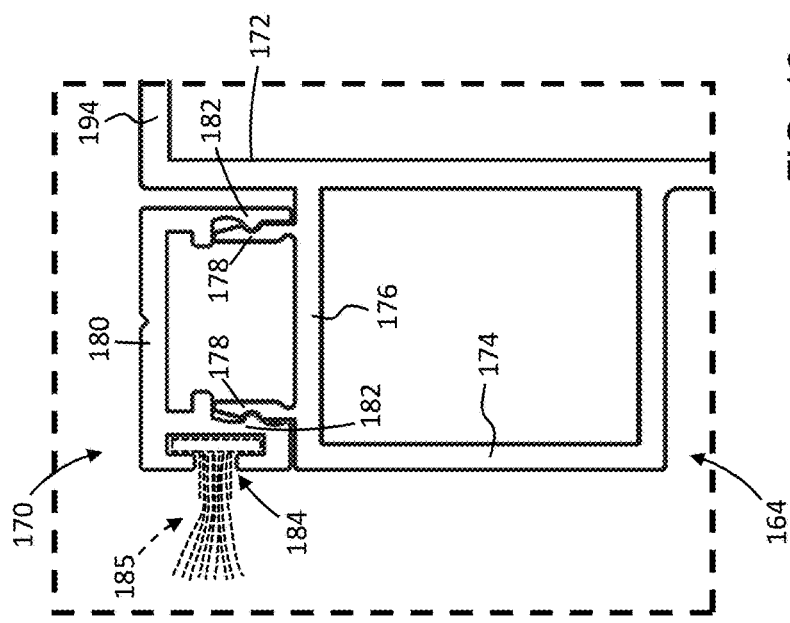

LOUVERED PERGOLA

This is a continuation of U.S. patent application Ser. No. 17/301,993, filed Apr. 21, 2021, which claims the benefit of U.S. Provisional Application No. 63/014,286, filed Apr. 23, 2020, each of which is hereby incorporated herein by reference in its entirety.

FIELD

The specification relates generally to pergolas, and more specifically, to pergolas having pivotable louvers.

BACKGROUND

European Pat. App. Pub. No 3,301,240 A1 (Cognet) relates to a pergola comprising at least four support posts for a frame arranged in a horizontal plane cooperating with a plurality of blades which can be oriented and can form an upper cover. The framework comprises at least two gutters parallel to each other supporting said blades via at least one bracket adapted to support and maintain the end of a blade, the shape and the mutual arrangement blades and gutters to collect rainwater at the blades and/or the gutters.

German Pat. App. Pub. No. 102018005087 A1 (Flaig) discloses a lamella roof having a supporting structure which has at least two supports arranged next to one another at a distance. A lamella arrangement comprises a plurality of lamellae arranged side by side and/or parallel to one another, each extending between the supports. The slats are each pivotably mounted about a longitudinal axis and are adjustable between a closed position in which adjacent slats partially overlap and an open position in which an intermediate space is formed between adjacent slats. An adjustment movement can be applied to the slats by means of an actuating device. A water channel extends in the longitudinal direction of one of the carriers and is held on the carrier. Water that collects on the top of the slats in their closed position can be fed into the water channel. The water channel can be adjusted relative to the support between a functional position in which it is arranged below the end faces of the slats facing the support and a rest position in which it is laterally offset relative to the end faces of the slats in the direction of the support.

European Pat. App. Pub. No. 3,363,963 A1 (Denninger et al.) discloses a pergola provided with retractable blades pivotally arranged along axes parallel to a common direction, the blades being connected to at least one actuating section, which comprises an actuating tube with axis parallel to the common direction, each actuating section being connected to the actuating tube by means of a connecting rod, which comprises a mechanism rotary actuator of the actuating tube, wherein the mechanism comprises a first step provided with an endless screw and an output shaft with a parallel axis to the axis of the tube and a gearbox disposed inside the tube and actuated by the outlet of the first step.

SUMMARY

The following summary is intended to introduce the reader to various aspects of the applicant's teachings, but not to define any invention.

According to some aspects, a louvered pergola includes: (a) a plurality of horizontally spaced apart posts; and (b) an elevated frame lying in a generally horizontal plane and supported by the posts. The frame includes a pair of laterally spaced apart side sections extending along a frame axis between a first end and a second end of the frame, a first end section extending laterally between the side sections at the first end of the frame, a second end section extending laterally between the side sections at the second end of the frame, and a central frame opening defined by the side, first end, and second end sections. The pergola further includes (c) a plurality of louvers in the frame opening and supported by the frame, each louver extending laterally across the frame opening along a louver axis perpendicular to the frame axis, the louver axes spaced apart from each other along the frame axis. The plurality of louvers include a first fixed louver fixed to the first end section of the frame, a second fixed louver fixed to the second end section of the frame, and a plurality of pivotable louvers pivotably supported by the side sections between the first and second fixed louvers. The pivotable louvers are linked for pivoting in unison between a closed position in which the plurality of louvers partially overlap with each other to close the frame opening and an open position in which a gap is provided between adjacent louvers of the plurality of louvers.

In some examples, each side section includes a gutter comprising an axial drainage channel extending along the frame axis at an elevation below the plurality of louvers. Each of the pivotable louvers and the first fixed louver comprises a lateral drainage channel extending along the louver axis and having an open top when the pivotable louvers are in the closed position for collecting and conveying water runoff to at least one of the axial drainage channels.

In some examples, each lateral drainage channel extends along the louver axis between laterally opposed ends, each end of the lateral drainage channel positioned above and open to a corresponding axial drainage channel.

In some examples, the plurality of louvers have complementary cross-sectional profiles for interlocking of each lateral drainage channel with an adjacent louver when the plurality of pivotable louvers are in the closed position.

In some examples, each of the pivotable louvers and the second fixed louver comprises an overhang portion extending over and into the lateral drainage channel of an adjacent louver when the pivotable louvers are in the closed position for guiding water runoff into the lateral drainage channel of the adjacent louver.

In some examples, the pergola is free of any laterally extending gutters fixed to the first end section and the second end section below the louvers.

In some examples, each of the first end section, the second end section, and the side sections extends lengthwise between opposed squared ends, and wherein the frame is generally rectangular and has four corners where the squared ends of perpendicular sections of the frame intersect in a corner butt joint arrangement.

In some examples, the squared ends in each corner are positioned over and supported by a corresponding post.

In some examples, the squared ends of the side sections are axially intermediate the first and second end sections.

In some examples, the post in each corner extends vertically between a lower end and an upper end, the upper end having a cut out receiving corresponding squared ends.

In some examples, at least one of the first fixed louver and the second fixed louver is selectively retractable and extendable along the frame axis for adjusting an axial extent of the at least one of the first fixed louver and the second fixed louver.

In some examples, the at least one of the first fixed louver and the second fixed louver comprises a mounting bracket fixed to the frame and a blade portion adjustably mounted to the bracket at an axial position for overlap with an adjacent pivotable louver, the axial position of the blade portion adjustable relative to the mounting bracket for adjusting the axial extent.

In some examples, the mounting bracket comprises a retaining clip receiving the blade portion, the clip and blade portion comprising interlocking protrusions and grooves for retaining the blade portion at the axial position while permitting selective adjustment of the axial position to one of a plurality of axial locations along the frame axis.

According to some aspects, a louvered pergola includes: (a) a plurality of horizontally spaced apart posts; (b) an elevated frame supported by the posts and defining a central frame opening; and (c) a plurality of louvers supported by the frame and extended parallel with each other across the frame opening. The plurality of louvers include a first louver fixed to the frame, a second louver fixed to the frame opposite the first louver, and a plurality of pivotable louvers pivotably supported by the frame between the first and second louvers. The pivotable louvers are pivotable between a closed position in which the plurality of louvers partially overlap with each other to close the frame opening and an open position in which a gap is provided between adjacent louvers of the plurality of louvers.

In some examples, the frame includes at least one gutter extending below and perpendicular to the plurality of louvers, and each of the pivotable louvers and the first louver comprises a drainage channel having an open top when the pivotable louvers are in the closed position for conveying water runoff to the at least one gutter.

In some examples, each of the pivotable louvers and the second fixed louver comprises an overhang portion extending over and into the drainage channel of an adjacent louver when the pivotable louvers are in the closed position for guiding water runoff into the drainage channel of the adjacent louver.

In some examples, the frame is generally rectangular and comprises four corners where perpendicular sections of the frame intersect in a corner butt joint arrangement.

In some examples, at least one of the first louver and the second louver is selectively retractable and extendable along the frame axis for adjusting an axial extent of the at least one of the first louver and the second louver.

According to some aspects, a louvered pergola comprises: (a) a plurality of horizontally spaced apart posts; and (b) a frame supported by the posts and extending axially along a frame axis between a first end and a second end. The frame includes a pair of laterally spaced apart side sections extending along the frame axis between the first and second ends. Each side section includes a louver mount comprising a plurality of apertures spaced axially apart from each other along the frame axis. Each aperture passes through the louver mount perpendicular to the frame axis. The pergola further includes (c) a plurality of louvers pivotably supported by the side sections for pivoting between a closed position in which the plurality of louvers are in engagement and overlap and an open position in which an axial gap is provided between adjacent louvers of the plurality of louvers. Each louver extends along a respective louver axis between opposed end faces and includes a mounting pin projecting from each end face along the louver axis. Each mounting pin is received in a corresponding aperture of the louver mount. Each aperture is open to a top of the louver mount to facilitate insertion and removal of the pins from above, and each side section further includes a retaining cap extending along the frame axis and detachably mounted overtop of the apertures of the side section for covering the apertures from above to retain the mounting pins therein.

In some examples, each side section comprises a beam extending along the frame axis and the louver mount is fixed laterally inboard of the beam, and wherein the beam and the louver mount are of integral, unitary, one-piece construction with each other.

In some examples, the louver mount has a louver mount sidewall spaced laterally inwardly from the beam, and a louver mount top wall extending laterally between an upper edge of the louver mount sidewall and the beam. Each aperture passes laterally through the sidewall and vertically through the top wall, and the cap is mounted atop the top wall for covering the apertures from above.

In some examples, each side section includes a gutter extending along the frame axis, the gutter defining a gutter opening laterally inboard of the beam and below the end faces of the louvers for collecting water runoff from the louvers, and wherein the beam, the louver mount, and the gutter are of integral, unitary, one-piece construction with each other.

In some examples, the gutter defines an axial drainage channel in fluid communication with the gutter opening for conveying the water along the frame axis, the axial drainage channel extending along the frame axis directly below the beam.

In some examples, the cap is detachably mounted to the louver mount through a snap-fit connection.

According to some aspects, a kit of parts is provided for assembling the pergola as defined above and/or disclosed herein.

BRIEF DESCRIPTION OF THE DRAWINGS

The drawings included herewith are for illustrating various examples of apparatuses, articles, and methods of the present specification and are not intended to limit the scope of what is taught in any way. In the drawings:

FIG. 5 is a cross-sectional view of the pergola of FIG. 1, taken along line 5-5 in FIG. 4;

FIG. 6A is a cross-sectional profile view of a first fixed louver of the pergola of FIG. 1;

FIG. 6B is a cross-sectional profile view of a second fixed louver of the pergola of FIG. 1;

FIG. 6C is a cross-sectional profile view of a pivotable louver of the pergola of FIG. 1;

FIG. 12 is an enlarged view of a portion of FIG. 5; and

FIG. 13 is a cross-sectional profile view of the side section portion of the pergola of FIG. 1.

DETAILED DESCRIPTION

Various apparatuses or processes will be described below to provide an example of an embodiment of each claimed invention. No embodiment described below limits any claimed invention and any claimed invention may cover apparatuses or processes that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

According to some aspects of the teachings disclosed herein, design improvements can advantageously be made to pergolas having pivotable louvers to help, for example, reduce costs and simplify assembly and installation, which can be particularly useful where the pergola components are sold as a kit for installation by end users and/or contractors.

Figure 1:
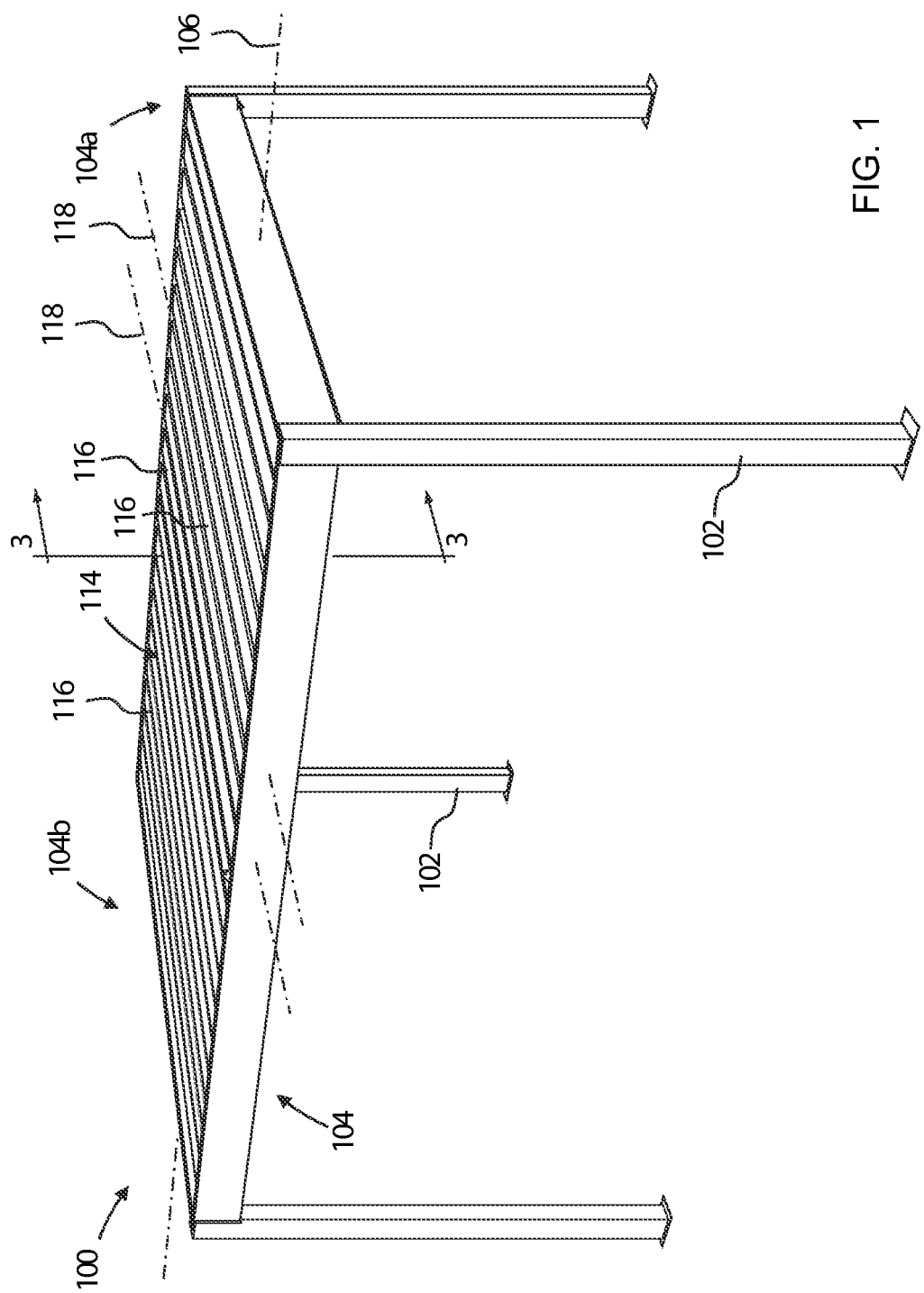
FIG. 1 is a perspective view of an example pergola.

Referring to FIG. 1, an example pergola 100 is shown. In the example illustrated, the pergola 100 includes a plurality of horizontally spaced apart posts 102 and an elevated frame 104 supported by the posts 102. In the example illustrated, the frame 104 lies in a generally horizontal plane and extends along a generally horizontal frame axis 106 between a first end 104a and a second end 104b axially opposite the first end 104a. In the example illustrated, the frame 104 is generally rectangular and has four corners where perpendicular sections of the frame 104 intersect and are supported by corresponding posts 102.

Figure 2:
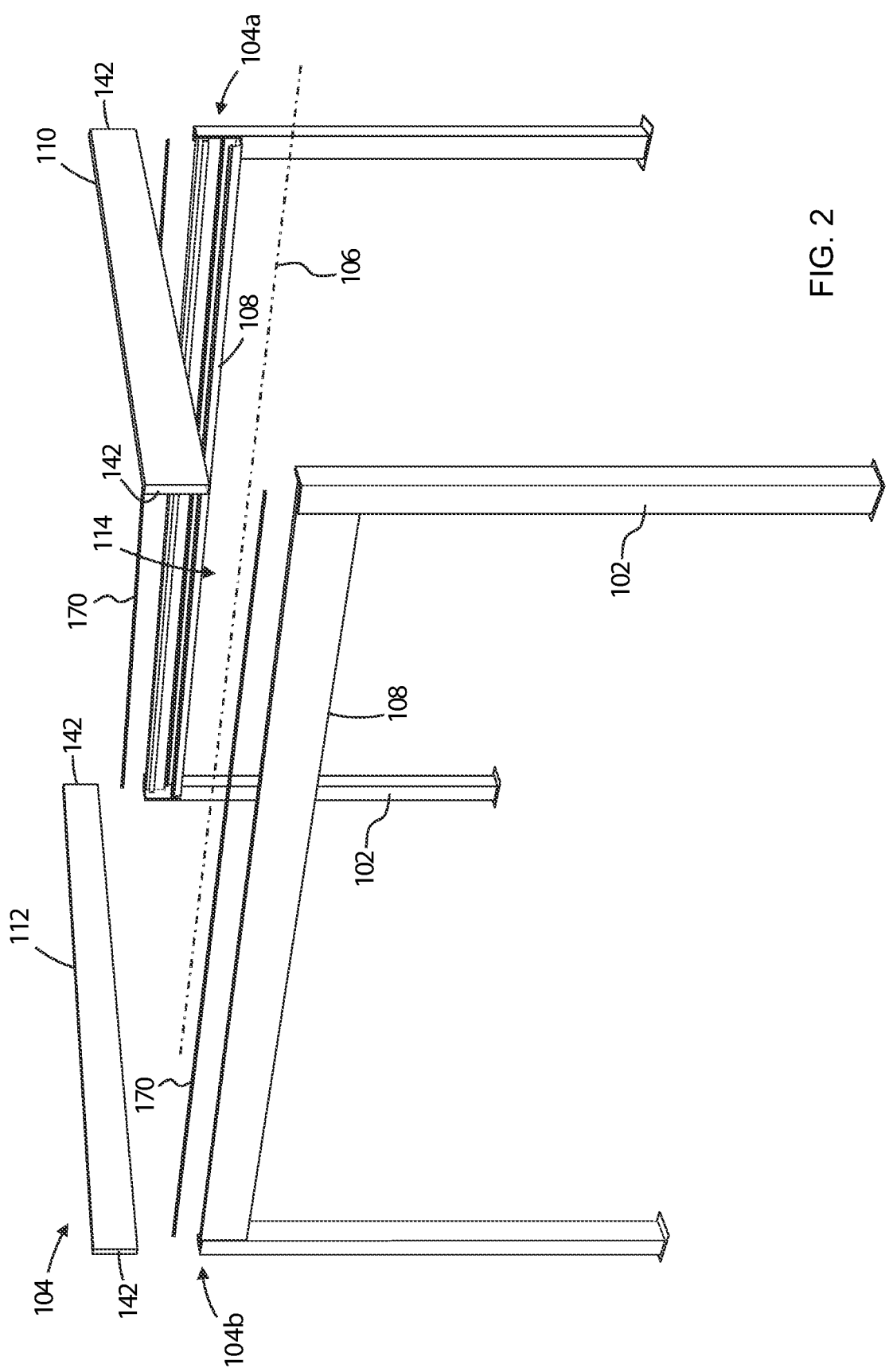
FIG. 2 is a partially exploded perspective view of frame portions of the pergola of FIG. 1.

Referring to FIG. 2, in the example illustrated, the frame 104 includes a pair of laterally spaced apart side sections 108 extending along the frame axis 106 between the first end 104a and the second end 104b of the frame 104. The frame 104 further includes a first end section 110 extending laterally between the side sections 108 at the first end 104a of the frame 104, and a second end section 112 extending laterally between the side sections 108 at the second end 104b of the frame 104. The side and end sections 108, 110, 112 define a central frame opening 114 of the frame 104.

Referring to FIG. 1, in the example illustrated, the pergola 100 further includes a plurality of louvers 116 in the frame opening 114 and supported by the frame 104. Each louver 116 extends laterally across the frame opening 114 along a louver axis 118 perpendicular to the frame axis 106. In the example illustrated, the louver axes 118 are spaced apart from each other along the frame axis 106 and are at a generally common elevation.

Figure 3:
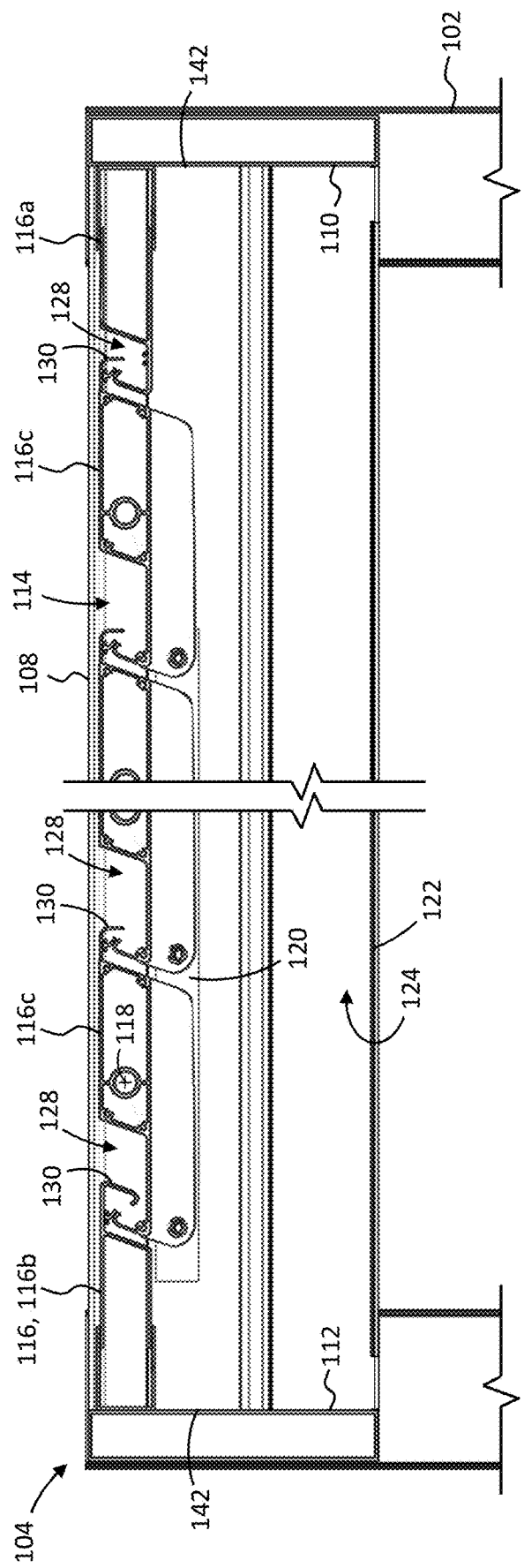
FIG. 3 is a cross-sectional view of the pergola of FIG. 1, taken along line 3-3 in FIG. 1 and showing louvers of the pergola in a closed configuration.
Figure 4:
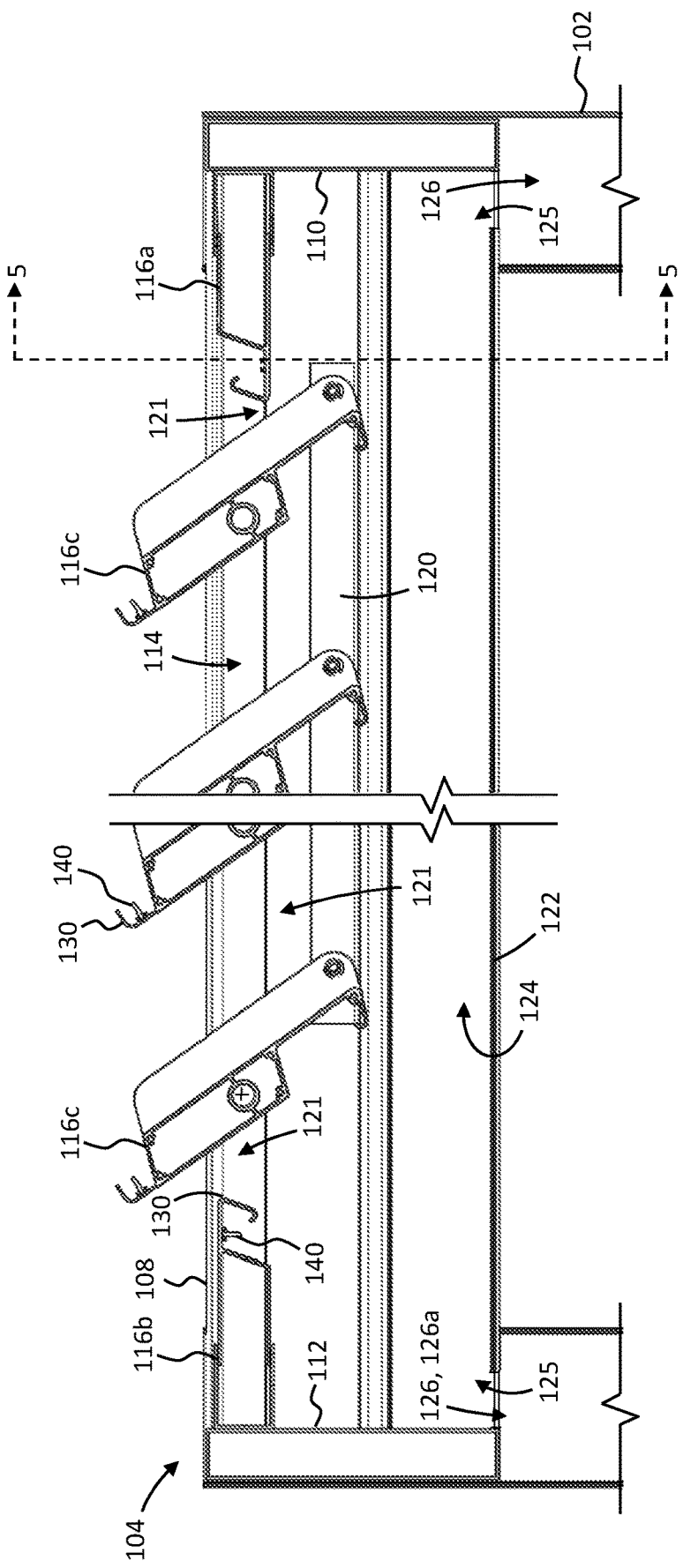
FIG. 4 is a cross-sectional view like that of FIG. 3, but showing the louvers in an open configuration.

Referring to FIG. 3, in the example illustrated, the plurality of louvers 116 include a first fixed louver 116a fixed to the first end section 110 of the frame 104, a second fixed louver 116b axially opposite the first fixed louver 116a and fixed to the second end section 112 of the frame 104, and a plurality of pivotable louvers 116c pivotably supported by the side sections 108 between the first and second fixed louvers 116a, 116b. In the example illustrated, the pivotable louvers are linked (through linkage 120, in the example illustrated) for pivoting in unison between a closed position (shown in FIG. 3) and an open position (shown in FIG. 4). Referring to FIG. 3, when in the closed position, the plurality of louvers 116 partially overlap with each other to close the frame opening 114. Referring to FIG. 4, when in the open position, a gap 121 is provided between adjacent louvers 116 of the plurality of louvers 116.

Figure 9:
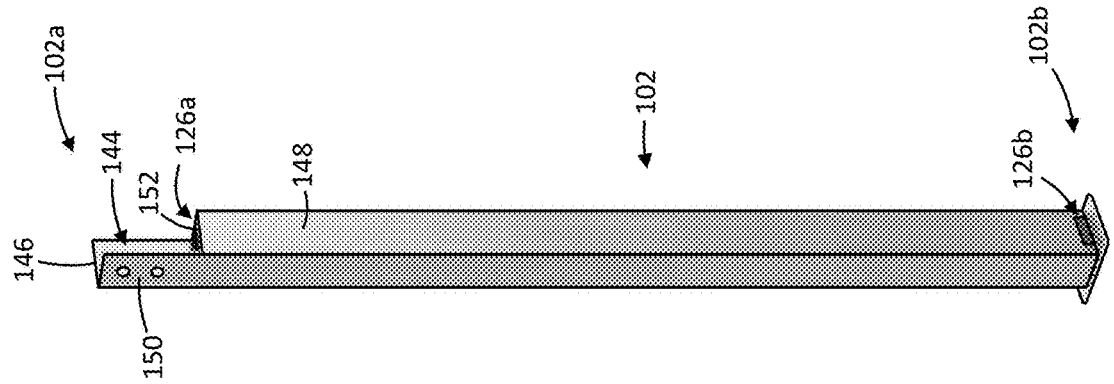
FIG. 9 is a perspective view of a post structure of the pergola of FIG. 1.
Figure 8:
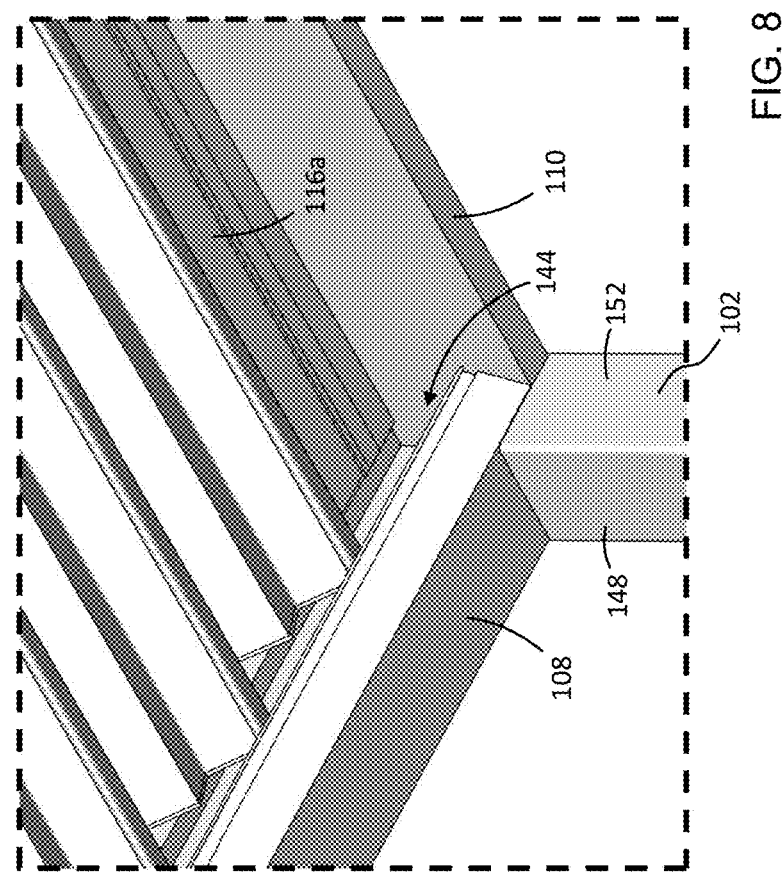
FIG. 8 is an enlarged perspective view taken from below of the corner portion of the pergola of FIG. 1.

Referring to FIG. 5, in the example illustrated, each side section 108 includes a gutter 122 defining an axial drainage channel 124 extending along the frame axis 106 at an elevation below the louvers 116 and having an open top for collecting water runoff from the louvers 116. Referring to FIG. 4, in the example illustrated, each post 102 is hollow and comprises an internal downspout channel 126 extending vertically through the post 102, and each axial drainage channel 124 is in fluid communication with at least one of the internal downspout channels 126 for conveying the water runoff to the downspout channels 126. In the example illustrated, each axial drainage channel 124 extends along the frame axis 106 between axially opposed ends 125, and each end 125 of the axial drainage channel 124 is above and open to a corresponding downspout channel 126. Referring to FIG. 9, in the example illustrated, each downspout channel 126 extends vertically between an inlet 126a at an upper end 102a of each post 102 and open to a corresponding axial drainage channel 124 (FIG. 4) for receiving water therefrom, and an outlet 126b at a lower end 102b of each post 102 adjacent ground level and open to environment for discharging the water to ground level.

Referring to FIG. 3, in the example illustrated, each of the pivotable louvers 116c and the first fixed louver 116a comprises a lateral drainage channel 128 extending along the louver axis 118 and having an open top when the pivotable louvers 116c are in the closed position for collecting and conveying water runoff to at least one of the axial drainage channels 124. Referring to FIG. 5, in the example illustrated, each lateral drainage channel 128 extends along a corresponding louver axis 118 between laterally opposed ends 129, and each end 129 of the lateral drainage channel 128 is above and open to a corresponding axial drainage channel 124.

Referring to FIG. 3, in the example illustrated, the plurality of louvers 116 have complementary cross-sectional profiles for interlocking of each lateral drainage channel 128 with an adjacent louver 116 when the plurality of pivotable louvers 116c are in the closed position. This can help to, for example, provide a water-tight closure over the frame opening 114 when the pivotable louvers 116c are in the closed position and facilitate collection and channeling of water runoff from the louvers 116 to ground level. In the example illustrated, each of the pivotable louvers 116c and the second fixed louver 116b has an overhang portion 130 extending axially over and downwardly into the lateral drainage channel 128 of an adjacent louver 116 when the pivotable louvers 116c are in the closed position for guiding water runoff into the lateral drainage channel 128 of the adjacent louver 116.

Referring to FIG. 5, in the example illustrated, each louver 116 extends along its louver axis 118 between laterally opposite end faces 117 (see also FIG. 10), and each end face 117 is positioned above a corresponding axial drainage channel 124. Referring to FIGS. 6A to 6C, in the example illustrated, each louver 116 has a first edge 132 extending along the louver axis 118 and a second edge 134 opposite the first edge 132. In the example illustrated, the louver axis 118 is between the first and second edges 132, 134, and the pivotable louvers 116c pivot about respective louver axes 118 between the open and closed positions. In the example illustrated, when the pivotable louvers 116c are in the closed position, the first edge 132 of each louver 116 is disposed toward the second end section 110 and the second edge 134 is disposed toward the first end section 110. In the example illustrated, when the pivotable louvers 116c are in the closed position, each louver 116 has a topside surface 136 extending laterally between the end faces 117 and between the first and second edges 132, 134, and an underside surface 138 opposite the topside surface 136.

In the example illustrated, the lateral drainage channel 128 of each pivotable louver 116c and the first fixed louver 116a is open to each end face 117 and is at least partially defined by a portion of the topside surface 136 adjacent the first edge 132. In the example illustrated, the overhang portion 130 of each pivotable louver 116c and the second fixed louver 116b extends laterally between the end faces 117 and is at least partially defined by a portion of the topside surface 136 adjacent the second edge 134.

In the example illustrated, the first fixed louver 116a projects axially inwardly from an axially inner surface of the first end section 110, and the second edge 134 of the first fixed louver 116a is fixed against the axially inner surface of the first end section 110. In the example illustrated, the interface between the first fixed louver 116a and the first end section 110 is sealed to inhibit leakage of water therebetween.

In the example illustrated, the second fixed louver 116b projects axially inwardly from an axially inner surface of the second end section 112, and the first edge 132 of the second fixed louver 116b is fixed against the axially inner surface of the second end section 112. In the example illustrated, the interface between the second fixed louver 116b and the second end section 112 is sealed to inhibit leakage of water therebetween. In some examples, portions of the fixed louvers 116a, 116b may be formed integrally with respective end sections 110, 112, which may reduce the need for sealing the interfaces between the fixed louvers and the respective end sections.

When the pivotable louvers 116c are in the closed position, water collecting on the topside surface 136 of each pivotable louver 116c can runoff into the lateral drainage channel 128 of the pivotable louver 116c and/or off the overhang portion 130 of the pivotable louver 116c and into the lateral drainage channel 128 of an adjacent louver 116. Water collecting on the topside surface 136 of the first fixed louver 116a can runoff into the lateral drainage channel 128 of the first fixed louver 116a. Water collecting on the topside surface 136 of the second fixed louver 116b can run off the overhang portion 130 of the second fixed louver 116b and into the lateral drainage channel 128 of an adjacent pivotable louver 116c when in the closed position.

Referring to FIG. 4, in the example illustrated, each pivotable louver 116c and the second fixed louver 116b includes at least one seal member 140 extending along the louver axis 118 for sealing an interface between adjacent louvers 116 when the pivotable louvers 116c are in the closed position. In the example illustrated, each seal member 140 comprises a polymeric strip extending between the end faces 117 of the louvers 116. In the example illustrated, each seal member 140 is fixed to the underside surface 138 of a corresponding louver 116 adjacent and inboard of the overhang portion 130.

Providing the pergola 100 with first and second fixed louvers 116a, 116b having interlocking and/or drainage features can allow the pergola 100 to be free of any laterally extending gutters fixed to the first and second end sections 110, 112 below the louvers 116. This can allow for a more pleasant and clean aesthetic at the end sections of the frame 104 when viewed from below, and may also facilitate simplified manufacturing, assembly, and/or installation of the frame sections relative to some other types of pergola frames.

Figure 7:
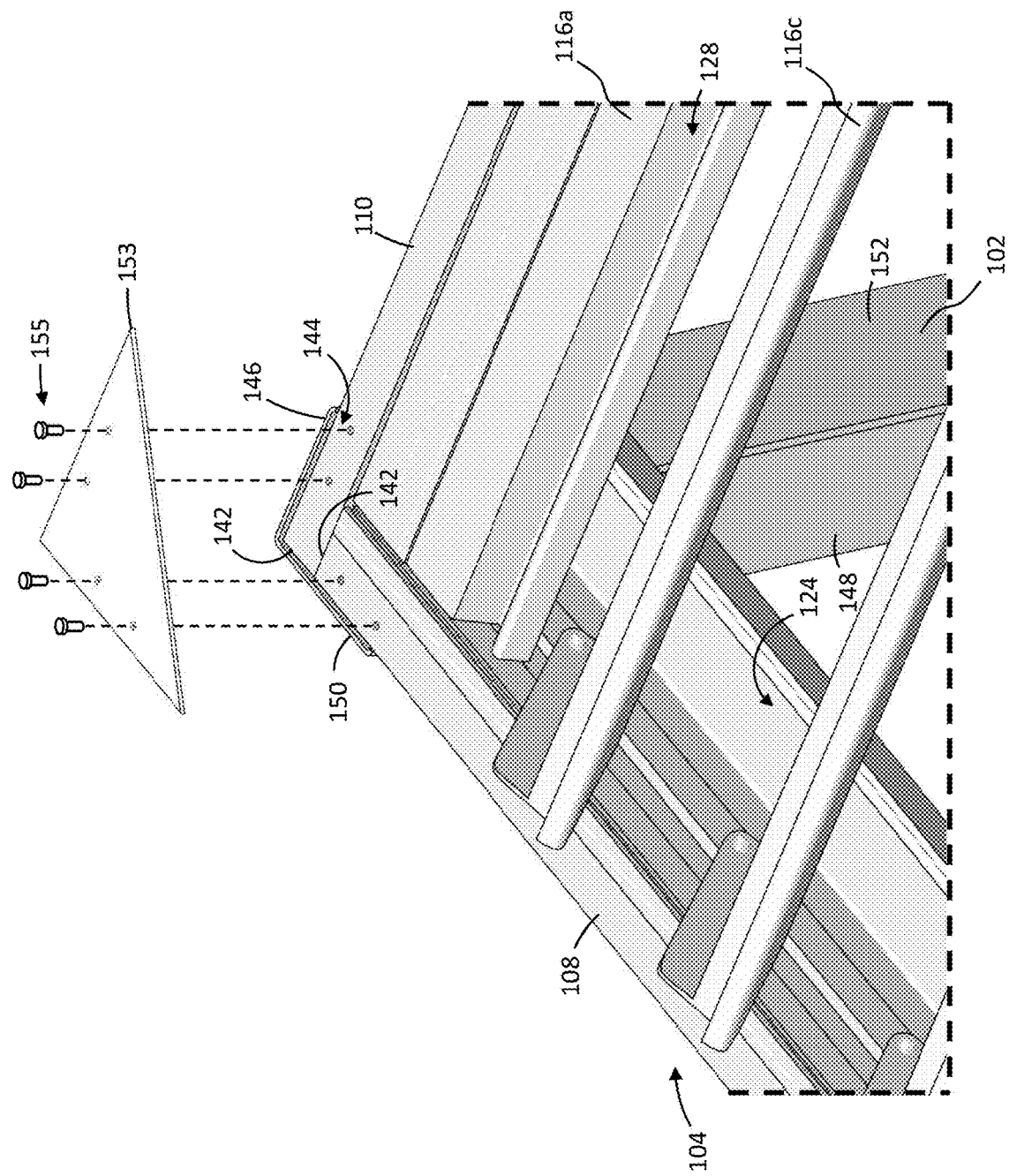
FIG. 7 is an enlarged, partially exploded perspective view taken from above of a corner portion of the pergola of FIG. 1 with the louvers shown in the open configuration.

For example, referring to FIG. 7, in the example illustrated, each of the first end section 110, the second end section 112 (FIG. 2), and the side sections 108 extends lengthwise between opposed squared ends 142. In each corner of the frame 104, the squared ends 142 of perpendicular sections of the frame 104 (the side and first end sections 108, 110 in the example shown in FIG. 7) intersect in a corner butt joint arrangement. In the example illustrated, the squared ends 142 in each corner are positioned over and supported by a corresponding post 102, and the squared ends 142 of the side sections 108 are axially intermediate the first and second end sections 110, 112 (see also FIG. 3).

Referring to FIG. 9, in the example illustrated, each post 102 extends vertically between an upper end 102a adjacent the frame 104 and a lower end 102b adjacent ground level. In the example illustrated, each upper end 102a has a cut out 144 receiving the squared ends 142 (FIG. 7) of the frame sections supported by the post 102. In the example illustrated, each post 102 has a generally square cross-sectional profile and comprises an axially outer sidewall 146, an axially inner sidewall 148 opposite the axially outer sidewall 146, a laterally outer sidewall 150 extending between the axially outer and inner sidewalls 146, 148, and a laterally inner sidewall 152 opposite the laterally outer sidewall 150 and extending between the axially outer and inner sidewalls 146, 148. Referring to FIG. 7, in the example illustrated, the cut out 144 is formed at a top end of the axially and laterally inner sidewalls 148, 152, and the axially and laterally outer sidewalls 146, 150 extend upwardly to an elevation above the axially and laterally inner sidewalls 148, 152 and conceal the squared ends 142 of the frame sections supported by the post 102.

In the example illustrated, each of the first end section 110 and the second end section 112 extends over the laterally inner sidewall 152 and is fastened to the axially outer sidewall 146 of a corresponding post 102. Each side section 108 extends over the axially inner sidewall 148 and is fastened to the laterally outer sidewall 150 of a corresponding post 102. In the example illustrated, the gutter 122 of each side section 108 extends over the laterally inner sidewall 152 for fluid communication with the downspout channel 126 (FIG. 3). Referring to FIG. 7, in the example illustrated, each corner of the frame 104 includes a reinforcement plate 153 mounted atop and joining the perpendicular sections of the frame 104 in that corner (e.g. frame sections 108, 110 in the example shown in FIG. 5) for reinforcement. In the example illustrated, each reinforcement plate 153 lies in a generally horizontal plane and is fastened atop the corresponding perpendicular sections of the frame 104 via fasteners 155 passing vertically through the plate 153 and into the perpendicular frame sections in each corner. In the example illustrated, each reinforcement plate 153 is generally triangular in shape.

Referring to FIGS. 6A to 6C, in the example illustrated, at least one of the first fixed louver 116a and the second fixed louver 116b is selectively retractable and extendable along the frame axis for adjusting an axial extent of the at least one of the first fixed louver 116a and the second fixed louver 116b. In the example illustrated, the axial extent is between the first and second edges 132, 134 of the fixed louvers 116a, 116b. This can allow for adjustment of the fixed louvers where, for example, the side sections have a non-standard length (e.g. for a custom installation) so that the fixed louvers 116*a*, 116*b* are sized for proper overlap (and interlocking, in the example illustrated) with adjacent pivotable louvers 116*c* in the closed position. In the example illustrated, each of the first fixed louver 116*a* and the second fixed louver 116*b* is selectively retractable and extendable.

In the example illustrated, each of the fixed louvers 116*a*, 116*b* comprises a mounting bracket 154 fixed to respective end sections 110, 112 of the frame 104 and a blade portion 156 adjustably mounted to the bracket 154 at an axial position for overlap with an adjacent pivotable louver 116*c*. In the example illustrated, the blade portion 156 of the first fixed louver 116*a* comprises the lateral drainage channel 128 of the fixed louver 116*a*, and the blade portion 156 of the second fixed louver 116*b* comprises the overhang portion 130 of the fixed louver 116*b*.

In the example illustrated, the axial position of the blade portion 156 is adjustable relative to the mounting bracket 154 for adjusting the axial extent of the fixed louvers 116*a*, 116*b*. In the example illustrated, the mounting bracket 154 comprises a retaining clip receiving the blade portion 156. The clip comprises a pair of vertically facing clip surfaces 158 in engagement with vertically opposite blade portion surfaces 160 of the blade portion 156. The clip and blade portion surfaces 158, 160 comprise interlocking protrusions and grooves 162 for retaining the blade portion 156 at the axial position while permitting selective adjustment of the axial position to one of a plurality of axial locations along the frame axis 106. In the example illustrated, each of the end sections 110, 112 comprises a hollow end beam extending between the side sections 108, and each bracket 154 is fastened against an axially inner surface of a corresponding end beam. In some examples, each bracket 154 may be formed integrally with a corresponding end beam.

Figure 10:
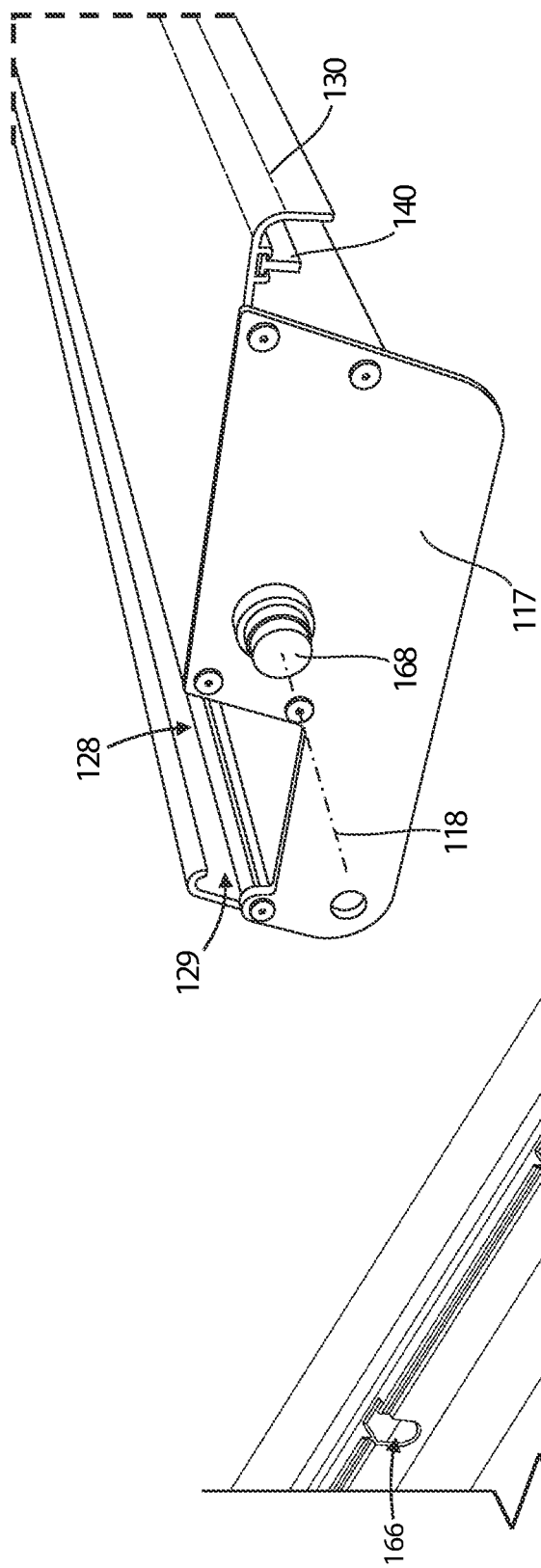
FIG. 10 is a perspective view of a louver portion of the pergola of FIG. 1.
Figure 11:
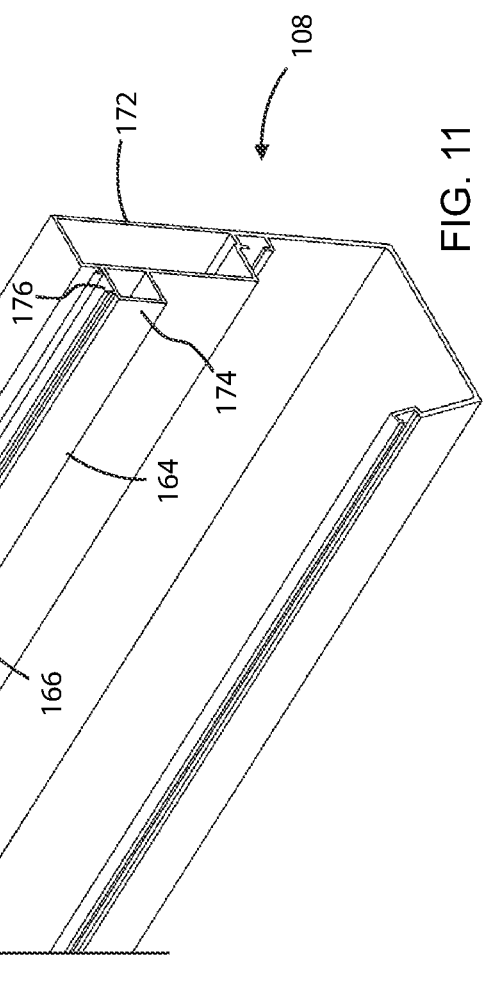
FIG. 11 is a perspective view of a side section portion of the pergola of FIG. 1.

Referring to FIG. 11, in the example illustrated, each side section 108 includes a louver mount 164 comprising a plurality of apertures 166 spaced axially apart from each other along the frame axis. In the example illustrated, each aperture 166 passes through the louver mount 164 perpendicular to the frame axis. Referring to FIGS. 10 and 11, in the example illustrated, each pivotable louver 116*c* has a mounting pin 168 projecting from each end face 117 along the louver axis 118, and each mounting pin 168 is received in a corresponding aperture 166 of the louver mounts 164 for pivotably supporting the pivotable louvers 116*c*. In the example illustrated, each aperture 166 is open to a top of the louver mount 164 to facilitate insertion of the mounting pins 168 from above. Referring to FIG. 12, in the example illustrated, each side section 108 further includes a retaining cap 170 (see also FIG. 2) extending along the frame axis 106 and detachably mounted overtop of the apertures 166 (FIG. 11) of the side section 108 for covering the apertures 166 from above to retain the mounting pins 168 (FIG. 10) therein.

Referring to FIG. 13, in the example illustrated, each side section 108 comprises a hollow side section beam 172 extending along the frame axis 106 between the end sections 110, 112 (FIG. 2). In the example illustrated, the louver mount 164 is fixed laterally inboard of the side section beam 172. In the example illustrated, the beam 172 and louver mount 164 of the side section 108 are of integral, unitary, one-piece construction with each other.

Referring to FIG. 11, in the example illustrated, the louver mount 164 has a louver mount sidewall 174 spaced laterally inwardly from the side section beam 172, and a louver mount top wall 176 extending laterally between and joining the louver mount sidewall 174 and the beam 172. Each aperture 166 passes laterally through the sidewall 174 and vertically through the top wall 176. Referring to FIG. 12, the retaining cap 170 is mounted atop the top wall 176 for covering the apertures 166 from above.

In the example illustrated, the retaining cap 170 is detachably mounted to the louver mount 164 through a snap-fit connection. In the example illustrated, the louver mount 164 comprises laterally spaced apart protrusions 178 projecting upwardly from the louver mount top wall 176, and the cap 170 has a cap top wall 180 and a pair of laterally spaced apart cap sidewalls 182 extending downwardly from the cap top wall 180. The cap sidewalls 182 and louver mount protrusions 178 are shaped for snap-fit connection with each other.

In the example illustrated, the cap 170 further includes a brush strip mounting slot 184 to retain a brush strip 185 (shown schematically in FIG. 12) for brushing the end faces 117 of the pivotable louvers 116*c* during movement between the open and closed positions.

Referring to FIG. 13, in the example illustrated, the side section beam 172, the louver mount 164, and the gutter 122 of each side section 108 are of integral, unitary, one-piece construction with each other, and in the example illustrated, are formed from a common extrusion. This can help to, for example, reduce material costs and/or simplify manufacturing, assembly, and/or installation by not requiring the mounting of a separate louver mount and/or gutter to the beam and/or application of sealant at the interface between the louver mount and the beam and/or between the gutter and the beam.

In the example illustrated, the gutter 122 has a gutter opening 186 laterally inward of the side section beam 172 and below the end faces of the louvers for receiving water runoff from the louvers. In the example illustrated, the axial drainage channel 124 is in fluid communication with the gutter opening 186 and extends along the frame axis 106 directly below the side section beam 172.

In the example illustrated, each side section beam 172 has a rectangular cross-sectional profile and comprises a beam inner sidewall 188, a beam outer sidewall 190 spaced laterally outwardly from the beam inner sidewall 188, a beam bottom wall 192 extending laterally between and joining bottom edges of the beam inner and outer sidewalls 188, 190, and a beam top wall 194 vertically opposite the beam bottom wall 192 and extending laterally between and joining top edges of the beam inner and outer sidewalls 188, 190. In the example illustrated, the louver mount 164 projects laterally inwardly from the beam inner sidewall 188. Referring to FIG. 12, in the example illustrated, the cap top wall 180 and the beam top wall 194 are adjacent and lie in a common horizontal plane, and together define a generally flat top surface of the side section 108.

Referring to FIG. 13, in the example illustrated, the gutter 122 has a gutter outer sidewall 196 extending downwardly from a bottom edge of the beam outer sidewall 190, a gutter inner sidewall 198 having an upper edge spaced laterally inwardly from the beam inner sidewall 188 by the gutter opening 186, and a gutter bottom wall 200 extending laterally between and joining bottom edges of the gutter inner and outer sidewalls 196, 198. The gutter inner, outer, and bottom sidewalls 196, 198, 200 define the axial drainage channel 124. In the example illustrated, the beam outer sidewall 190 and the gutter outer sidewall 198 lie in a common vertical plane and together define a laterally outer surface of the side section 108.

In the example illustrated, the linkage 120 (FIG. 4; in the form of an elongate bar in the example illustrated) linking the pivotable louvers 116*c* is disposed laterally intermediate the side section beam 172 and the louvers 116 and vertically intermediate the louver mount 164 and the gutter 122. In the example illustrated, the linkage 120 (FIG. 4) is directly below the louver mount 164 and above the gutter opening 186.

The invention claimed is:

1. A louvered pergola comprising:
   a) a plurality of horizontally spaced apart posts;
   b) an elevated frame supported by the posts, the frame including a pair of laterally spaced apart side sections extending along a frame axis between a first end and a second end of the frame, a first end section extending laterally between the side sections at the first end of the frame, a second end section extending laterally between the side sections at the second end of the frame, and a central frame opening defined by the side, first end, and second end sections; and
   c) a plurality of louvers in the frame opening and supported by the frame, each of the louvers extending laterally across the frame opening along a louver axis perpendicular to the frame axis, the louver axes spaced apart from each other along the frame axis, and the plurality of louvers including a static first louver projecting into the central frame opening from the first end section of the frame, a static second louver projecting into the central frame opening from the second end section of the frame, and a plurality of pivotable louvers pivotably supported by the side sections between the first and second louvers, the pivotable louvers linked for pivoting in unison between a closed position and an open position,
   d) wherein when the pivotable louvers are in the closed position, each pair of adjacent louvers of the plurality of louvers partially overlap in an interlocking arrangement to close the frame opening including (i) the static first louver and an adjacent first pivotable louver of the plurality of pivotable louvers partially overlapping in the interlocking arrangement and (ii) the static second louver and an adjacent second pivotable louver of the plurality of pivotable louvers partially overlapping in the interlocking arrangement, and when the pivotable louvers are in the open position, a gap is provided between each pair of adjacent louvers of the plurality of louvers including between (i) the static first louver and the adjacent first pivotable louver and (ii) the static second louver and the adjacent second pivotable louver, and wherein the static first and second louvers remain stationary relative to the frame during movement of the pivotable louvers between the open and closed positions, and wherein at least one of the first louver and the second louver is selectively retractable and extendable along the frame axis for adjusting an axial extent of the at least one of the first louver and the second louver.

2. The pergola of claim 1, wherein when the pivotable louvers are in the closed position, the plurality of louvers lie generally flat in a common plane, the plane extending axially along the frame axis and laterally along the pivot axes, and wherein when the pivotable louvers are in the open position, the pivotable louvers are oriented at an incline relative to the plane and the first and second louvers lie generally flat in the plane.

3. The pergola of claim 1, wherein each of the side sections includes a gutter comprising an axial drainage channel extending along the frame axis at an elevation below each louver of the plurality of louvers, and wherein each of the pivotable louvers and the static first louver comprises a lateral drainage channel extending along the louver axis and having an open top when the pivotable louvers are in the closed position for collecting and conveying water runoff to the axial drainage channel.

4. The pergola of claim 3, wherein each of the lateral drainage channels extends along the louver axis between laterally opposed ends, and wherein each of the ends of each of the lateral drainage channels is positioned above and open to one of the axial drainage channels.

5. The pergola of claim 3, wherein when the plurality of pivotable louvers are in the closed position, each of the lateral drainage channels of the plurality of louvers receives a portion of an adjacent louver of the plurality of louvers for interlocking of the plurality of louvers.

6. The pergola of claim 3, wherein each of the pivotable louvers and the second louver comprises an overhang portion extending over and into the lateral drainage channel of an adjacent louver of the plurality of louvers when the pivotable louvers are in the closed position for guiding water runoff into the lateral drainage channel.

7. The pergola of claim 3, wherein the pergola is free of any laterally extending gutters fixed to the first end section and the second end section below the plurality of louvers.

8. The pergola of claim 1, wherein the at least one of the first louver and the second louver comprises a mounting bracket fixed to the frame and a blade portion adjustably mounted to the bracket for overlap in the interlocking arrangement with an adjacent pivotable louver of the plurality of pivotable louvers, the blade portion translatable along the frame axis relative to the mounting bracket for adjusting the axial extent of the at least one of the first louver and the second louver.

9. The pergola of claim 1, wherein each of the first end section, the second end section, and the side sections extends lengthwise between opposed squared ends, and wherein the frame is generally rectangular and has four corners where the squared ends of perpendicular sections of the frame intersect in a corner butt joint arrangement.

10. The pergola of claim 9, wherein the squared ends in each of the corners are positioned over and supported by a corresponding one of the posts.

11. The pergola of claim 9, wherein the squared ends of the side sections are axially intermediate the first and second end sections.

12. The pergola of claim 9, wherein each of the posts extends vertically between a lower end and an upper end, the upper end having a cut out receiving a corresponding pair of the squared ends.

13. A louvered pergola comprising:
   a) a plurality of horizontally spaced apart posts;
   b) an elevated frame supported by the posts and defining a central frame opening extending along a frame axis;
   c) a plurality of louvers supported by the frame and extended parallel with each other across the frame opening perpendicular to the frame axis, the plurality of louvers including a static first louver fixed to the frame, a static second louver fixed to the frame opposite the static first louver, and a plurality of pivotable louvers pivotably supported by the frame between the static first and second louvers, the pivotable louvers pivotable relative to the static first and second louvers between a closed position in which each pair of adjacent louvers of the plurality of louvers interlock to close the frame opening including (i) the static first louver and an adjacent first pivotable louver of the plurality of pivotable louvers interlocking with each other and (ii) the static second louver and an adjacent second pivotable louver of the plurality of pivotable louvers interlocking with each other, and an open position in which a gap is provided between each pair of adjacent louvers of the plurality of louvers including between (i) the static first louver and the adjacent first pivotable louver and (ii) the static second louver and the adjacent second pivotable louver, and wherein at least one of the first louver and the second louver is selectively retractable and extendable along the frame axis for adjusting are axial extent of the at least one of the first louver and the second louver.

14. The pergola of claim 13, wherein when the pivotable louvers are in the closed position, the plurality of louvers lie generally flat in a common plane, the plane extending axially along the frame axis and laterally along the pivot axes, and wherein when the pivotable louvers are in the open position, the pivotable louvers are oriented at an incline relative to the plane and the first and second louvers lie generally flat in the plane.

15. The pergola of claim 13, wherein each of the pivotable louvers and the static first louver comprises a lateral drainage channel extending along the louver axis, each of the lateral drainage channels having an open top extending along the louver axis between laterally opposed open ends for collecting and laterally conveying water runoff.

16. The pergola of claim 15, wherein when the plurality of pivotable louvers are in the closed position, each lateral drainage channel of the plurality of louvers receives an overhang portion of an adjacent louver of the plurality of louvers for interlocking of the plurality of louvers.

17. The pergola of claim 13, wherein the at least one of the first louver and the second louver comprises a mounting bracket fixed to the frame and a blade portion adjustably mounted to the bracket for overlap in the interlocking arrangement with an adjacent pivotable louver of the plurality of pivotable louvers, the blade portion translatable along the frame axis relative to the mounting bracket for adjusting the axial extent of the at least one of the first louver and the second louver.

* * * * *

UNITED STATES PATENT AND TRADEMARK OFFICE
CERTIFICATE OF CORRECTION

| | | |
|---|---|---|
| PATENT NO. | : 11,913,224 B2 | |
| APPLICATION NO. | : 17/953573 | |
| DATED | : February 27, 2024 | |
| INVENTOR(S) | : Rostyslav Geriavenko and Marek Piotr Ciolek | |

It is certified that error appears in the above-identified patent and that said Letters Patent is hereby corrected as shown below:

In the Claims
Claim 13, Column 13, Line 8:
"are"
Should recite:
-- an --

Signed and Sealed this
Fifth Day of November, 2024

Katherine Kelly Vidal
*Director of the United States Patent and Trademark Office*